United States Patent [19]

Giallourakis

[11] Patent Number: 5,187,830
[45] Date of Patent: Feb. 23, 1993

[54] WASHING, DRYING AND SCRUBBING PAD

[75] Inventor: Michael A. Giallourakis, Tarpon Springs, Fla.

[73] Assignee: Sponge Fishing Co., Inc., Tarpon Springs, Fla.

[21] Appl. No.: 796,786

[22] Filed: Nov. 25, 1991

[51] Int. Cl.⁵ .......................................... A47L 17/08
[52] U.S. Cl. .................. 15/244.3; 15/244.4; 15/209.1
[58] Field of Search ............... 15/244.3, 244.4, 209 R, 15/118, 228, 229.1, 229.2, 229.3

[56] References Cited

U.S. PATENT DOCUMENTS

| | | | |
|---|---|---|---|
| 720,890 | 2/1903 | Campbell | 15/244.3 |
| 1,820,256 | 8/1931 | Stewart | 15/244.3 |
| 2,152,697 | 4/1939 | Kingman | 15/244.3 X |
| 2,255,497 | 9/1941 | Anderson | 15/229.12 |
| 2,753,581 | 7/1956 | Clark | 15/229.13 |
| 2,880,439 | 4/1959 | Swartz | 15/229.11 |
| 2,924,049 | 2/1960 | Spain | 15/118 |
| 2,940,100 | 6/1960 | Grossmeyer | 15/229.11 X |
| 2,948,911 | 8/1960 | Steiner | 15/229.11 X |
| 2,958,885 | 11/1960 | Donney | |
| 3,040,353 | 6/1962 | Gray | 15/244.3 X |
| 3,048,938 | 8/1962 | Mears | 15/209.1 X |
| 3,252,176 | 5/1966 | Gropper | 15/209.1 |
| 3,324,500 | 6/1967 | Fuller et al. | 15/229.12 X |
| 3,350,735 | 11/1967 | Pratt | 15/229.12 X |
| 3,406,420 | 10/1968 | Siemund | 15/209.1 X |
| 3,629,896 | 12/1971 | Sirnec | |
| 3,849,225 | 11/1974 | Haertle | 15/244.3 X |
| 3,857,133 | 12/1974 | Linenfelser | 15/244.3 X |
| 4,015,306 | 4/1977 | Fenster | 15/244.3 X |
| 4,159,883 | 7/1979 | Mizell | |
| 4,670,962 | 6/1987 | Gillourakis | 15/244.3 X |
| 4,945,599 | 8/1990 | Flynn | |
| 4,949,417 | 8/1990 | Wertz et al. | 15/118 X |

FOREIGN PATENT DOCUMENTS

| | | | |
|---|---|---|---|
| 149165 | 4/1937 | Fed. Rep. of Germany | 15/209.1 |
| 1177013 | 4/1959 | France | 15/209.1 |
| 438054 | 11/1967 | Switzerland | 15/118 |
| 11063 | of 1916 | United Kingdom | 15/244.3 |
| 646075 | 12/1950 | United Kingdom | 15/209.1 |
| 2063058 | 6/1981 | United Kingdom | 15/244.3 |

Primary Examiner—Frankie L. Stinson
Attorney, Agent, or Firm—James Creighton Wray

[57] ABSTRACT

A nylon mesh-covered sponge has a braided pull at one end of the mesh covering. A pocketed jacket made of a cleaning sheet material receives and holds the net-covered sponge. The entire assembly is used to wash a car. When a difficult spot is encountered, the net-covered sponge is partially or fully withdrawn from the jacket pocket to scrub the spot. The net covered sponge gives the jacket form and support, and the jacket provides quick access to the scrubber.

20 Claims, 2 Drawing Sheets

WASHING, DRYING AND SCRUBBING PAD

BACKGROUND OF THE INVENTION

Sponges are widely used in the cleaning of surfaces, and particularly in the washing of automobiles.

Scrubber sponges with a nylon mesh material enclosing the sponge are widely used for scrubbing difficult spots from surfaces.

Fleece washer mitts have been used for cleaning surfaces, and particularly for washing automobiles, and chamois are widely used for drying automobiles.

The inventor has made and sold sponges permanently encased in scrubber nets, permanently encased in fleece-like materials with exposed fibers, and permanently encased in perforated chamois material.

Washing and drying and scrubbing have required separate implements in the past. One cannot use a scrubbing implement on painted surfaces or highly polished surfaces because of the danger of scratching the surfaces.

A need exists to provide a single implement which is useful for all purposes of washing and scrubbing, and washing, scrubbing and drying.

SUMMARY OF THE INVENTION

The present invention is directed to the provision of cleaning implements in which washing or washing and drying implements hold scrubbing implements completely enclosed until the scrubbing implement is needed. The result is that the scrubbing implement is completely enclosed, and is prevented from contacting surfaces which the scrubbing implement might scratch.

A nylon mesh-covered sponge has a braided pull at one end of the mesh covering. A pocketed jacket made of a cleaning sheet material receives and holds the net-covered sponge. The entire assembly is used to wash a car. When a difficult spot is encountered, the net-covered sponge is partially or fully withdrawn from the jacket pocket to scrub the spot. The net covered sponge gives the jacket form and support, and the jacket provides quick access to the scrubber.

In a preferred embodiment, the cleaning apparatus comprises a generally rectangular sheet having spaced longitudinal first and second parallel edges and spaced first and second end edges at ends of the longitudinal edges. Stitches join the sheet together along the edges. A first open pocket is formed between the sheet within the sewn edges of the sheet, and an opening is formed along the edges of the sheet for providing access to the first pocket. A resilient rectangular block expels fluid when being squeezed and absorbs fluid when being released. A stiff mesh material overlies and surrounds the block and has edges stitched together, forming a second closed pocket for receiving and holding the block and forming with the block a scrubber block. A pull handle is connected to the scrubber block. The scrubber block is placed in the first pocket formed by the sheet, with the handle being exposed through the second open end so that the scrubber block may be partially or fully withdrawn from the first pocket while using the sheet when encountering a spot requiring action of the scrubber block. The scrubber block is received within the first pocket in a friction fit for holding the scrubber block in the first pocket during use of the sheet, and for partially holding the scrubber block in the first pocket when using an exposed portion of the scrubber block.

In a preferred embodiment, one of the sheets of the cleaning apparatus is folded with at least two of the edges sewn together. Stitches join the sheet edges together, and a first open pocket is formed by the sheet within the sewn edges of the sheet. An opening is formed along edges of the sheet for providing access to the first pocket. A preferred resilient rectangular block comprises a sponge block which expels fluid when it is squeezed and absorbs fluid when it is released. A stiff mesh material overlies and surrounds the sponge block and has edges stitched together, forming a second closed pocket for receiving and holding the block and forming with the sponge block a scrubber block which readily absorbs and expels water. The scrubber block is placed in the first pocket formed by the washing sheet, with the handle being exposed through the open end of the first pocket.

A preferred cleaning apparatus comprises a first open pocket formed between the sheets within the sewn longitudinal edges and the sewn first end edges of the sheets. An opening is formed along the second end edges of the sheets for providing access to the first pocket. A resilient rectangular sponge block expels fluid when being squeezed and absorbs fluid when being released. The scrubber block is placed in the first pocket formed by the washing sheet and chamois sheet, with the handle being exposed through the opening of the first pocket for partially or fully withdrawing of the scrubber block from the first pocket while using the washing sheet for washing or the drying sheet for drying when encountering a spot requiring action of the scrubber block.

These and further and other objects and features of the invention are apparent in the disclosure, which includes the above and ongoing written specification, with the claims and the drawings.

DETAILED DESCRIPTION OF THE DRAWINGS

Figure 1:
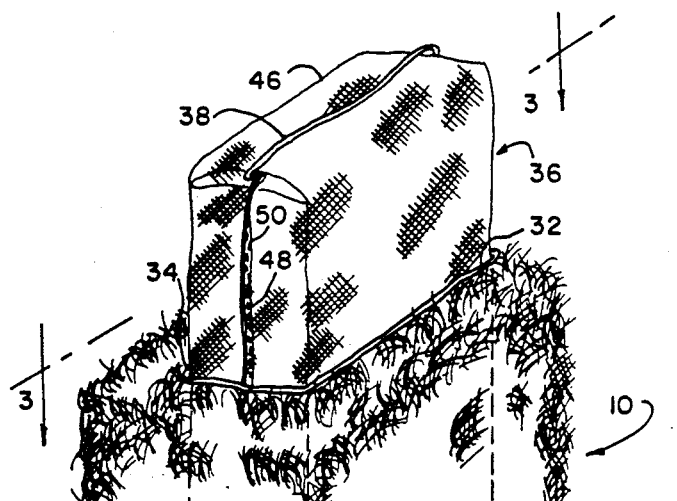
FIG. 1 is a view of a preferred embodiment of the invention in which a scrubber sponge block is partially withdrawn from an opening in a fleece jacket pocket.
Figure 2:
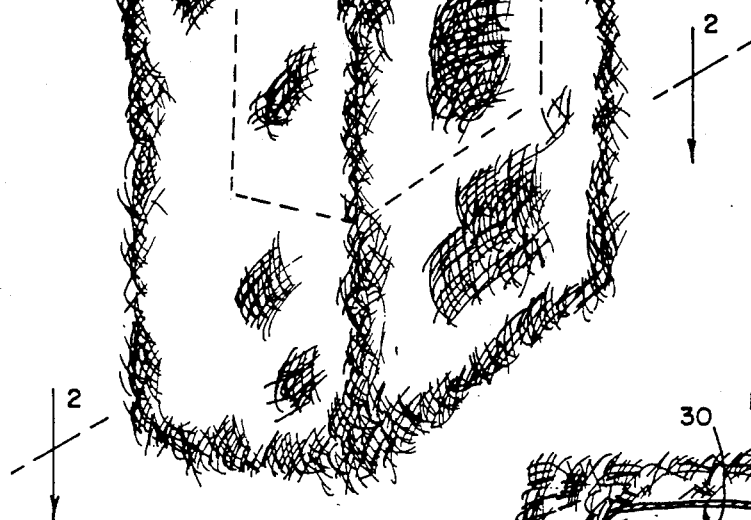
FIG. 2 is a sectional view taken along line 2—2 of FIG. 1.
Figure 3:
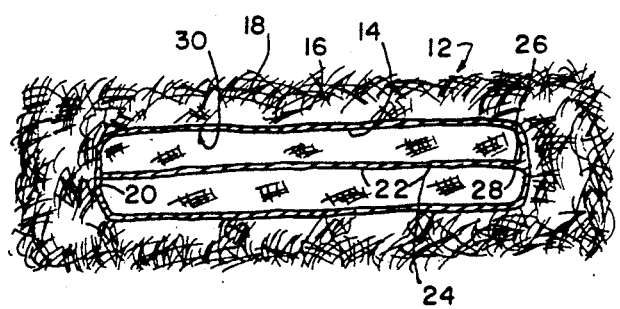
FIG. 3 is a sectional view taken along line 3—3 of FIG. 1.

Referring to FIGS. 1, 2 and 3, a washer and scrubber combination is generally indicated by the numeral 10. The washer jacket 12 is formed of a knitted back 14 fleece material 16 with exposed fibers 18. The jacket is formed preferably by folding the fleece material around a folded edge 20 and stitching adjacent edge portions 22 with lock stitches 24. End edges 26 are overlapped and are stitched together with overcast locking stitches 28. The result is to form a pocket 30 having upper edges 32, which are left unstitched and which form an opening 34 through which a scrubber block 36 may be inserted and may be partially removed by pulling on the handle or bail 38.

The scrubber block 36 is formed with a sponge block 40 and a knitted scrubber cover 42, which forms a second closed pocket 44 into which the sponge block 40 is received. The cover 42 is formed preferably by folding an end 46 and by juxtaposing edge portions 48 and stitching those edge portions with overcast locking stitches 50, and continuing the stitches to form a lock-stitched form handle 38. End portions 52 of the seam are tucked inward, as shown in FIG. 1. The opposite end has a formed seam with overcast stitches along the edge so that the stitches run completely around the block and are spaced from the folded portion 46 of the block to form the handle 38.

Figure 4:
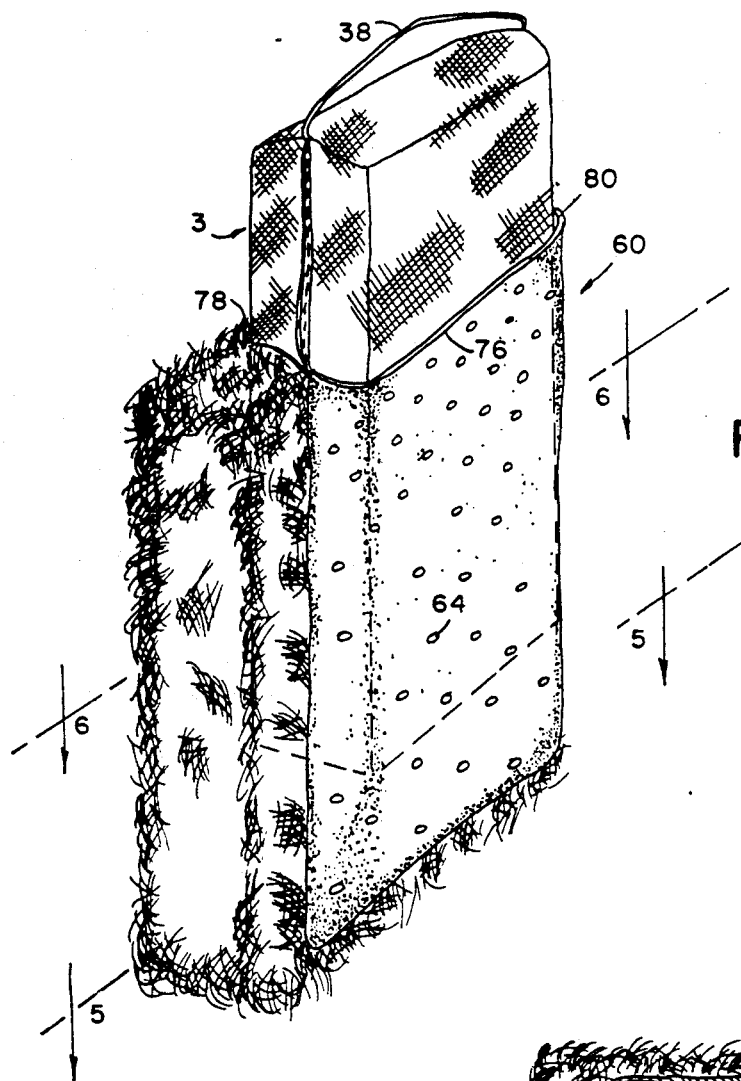
FIG. 4 is a perspective view of a scrubber block partially withdrawn from an opening of a pocket within a jacket formed by a fleece washing sheet material and a perforated chamois.
Figure 5:
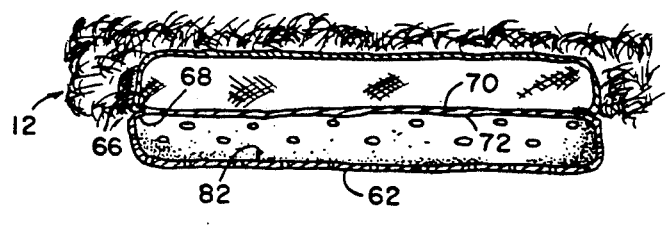
FIG. 5 is a sectional view taken along line 5—5 of FIG. 4.
Figure 6:
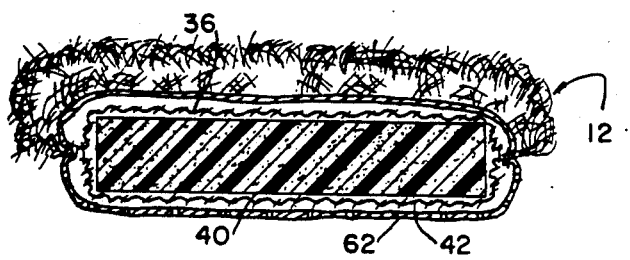
FIG. 6 is a sectional view taken along line 6-6 of FIG. 4.

An alternate preferred form of the invention is generally indicated by the numeral 60 in FIG. 4. Similar elements have similar numerals. In the FIG. 4 embodiment, the fleece-like washing sheet forms half of the jacket and half of the pocket, and a chamois material 62 with perforations 64 forms the second half of the jacket and pocket. The two sheets are joined together at longitudinal side edges 66 of the chamois and longitudinal side edges 68 of the washing sheet, and are joined together at first end edge 70 of the chamois and first end edge 72 of the washing sheet by locking stitches 74, which are sewn over the edges. A second end edge 76 of the chamois and a second end edge 78 of the washing sheet are left open to form the opening 80 of the pocket 82.

In use, the washing side 84 is used in the washing and rinsing of a surface, such as the painted surface on a vehicle and the chrome bumpers and windows, by immersing the entire apparatus 60 in water and detergent. Reimmersing the entire apparatus 60 in the detergent and water mixture and squeezing the apparatus pumps water from the sponge block through the fleece material, expelling dirt from the fibers.

When a difficult spot is encountered, such as on hub caps or bumpers, the scrubber block 36 is partially pulled from the pocket 82, and an exposed portion of the scrubber block is used to work on the difficult spot. The scrubber block is then pushed back into the pocket and washing continues.

The same operations are used when using the drying sheet, except that the apparatus is rinsed in clear water and squeezing the apparatus expels water through the chamois and expels dirt from the chamois. The scrubber block is partially withdrawn and used and reinserted when difficult spots are encountered.

In preferred embodiments, the sponge block is a high grade polyurethane sponge with honeycomb cell structure for maximum water absorption and dirt expulsion. The mesh cover material in a preferred form is specially designed, extra stiff diamond weave, 100% nylon-poly mesh. The mesh is lock-stitched around three edges with a pull formed around the folded edge, and with the corners tucked in.

In preferred embodiments the washing sheet is formed of extra dense, high pile Herculite fibers. The fabric is lock-stitched at the bottom and one side of the pocket. The fabric on which the fibers are mounted is preferably a knitted fabric. Preferably the general direction of the knitting extends around the pocket, and the knitting and mesh covering cooperate to hold the scrubber block in the open pocket by friction.

The preferred drying sheet is a genuine chamois leather, which is perforated to maximize water absorption and dirt expulsion.

While the invention has been described with reference to specific embodiments, modifications and variations of the invention may be constructed without departing from the scope of the invention, which is defined in the following claims.

I claim:

1. Cleaning apparatus, comprising a generally rectangular washing sheet having first and second spaced parallel longitudinal edges and spaced first and second end edges at ends of the longitudinal edges, a generally rectangular drying sheet having first and second spaced parallel longitudinal edges and spaced first and second end edges at opposite ends of the longitudinal edges, stitches joining the sheets together along the first and second spaced longitudinal edges and first end edges of both sheets, a first open pocket formed between the sheets within the sewn longitudinal edges and the sewn first end edges of the sheets, an opening formed along the second end edges of the sheets for providing access to the first pocket, a resilient rectangular sponge block for fluid expulsion when being squeezed and fluid absorption when being released, a stiff mesh material overlying and surrounding the block and having edges stitched together, forming a second closed pocket for receiving and holding the block and forming with the sponge block a scrubber block which readily absorbs and expels water, a pull handle connected to the scrubber block, the scrubber block being placed in the first pocket formed by a washing sheet and a chamois sheet, with the handle being exposed through the opening of the first pocket for partially or fully withdrawing of the scrubber block from the first pocket while using the washing sheet for washing or the drying sheet for drying when encountering a spot requiring action of the scrubber block, the scrubber block being received within the first pocket in a friction fit for holding the scrubber block in the first pocket during use of the washing sheet or drying sheet, and for partially holding the scrubber block in the first pocket during use of the scrubber block.

2. The apparatus of claim 1, wherein the washing sheet is a high pile fabric having exposed fibers for sudsing and washing.

3. The apparatus of claim 2, wherein the fibers are Herculite fibers.

4. The apparatus of claim 1, wherein the drying sheet is a leather chamois.

5. The apparatus of claim 4, wherein the chamois is perforated for water absorption and dirt expulsion.

6. Cleaning apparatus, comprising a generally rectangular washing sheet having spaced longitudinal edges and spaced first and second end edges at ends of the longitudinal edges, one of the sheets being folded with at least two of the edges sewn together, stitches joining the sheet edges together, a first open pocket formed by the sheet within the sewn edges of the sheet, an opening formed along edges of the sheet for providing access to the first pocket, a resilient rectangular sponge block for fluid expulsion when being squeezed and fluid absorption when being released, a stiff mesh material overlying and surrounding the block and having edges stitched together, forming a second closed pocket for receiving and holding the block and forming with the sponge block a scrubber block which readily absorbs and expels water, a pull handle connected to the scrubber block, the scrubber block being placed in the first pocket formed by the washing sheet, with the handle being exposed through the open end of the first pocket, for partially or fully withdrawing the scrubber block from the pocket while using the washing sheet for washing when encountering a spot requiring action of the scrubber block, the scrubber block being received within the first open pocket in a friction fit for holding the scrubber block in the first pocket during use of the washing sheet, and for partially holding the scrubber block in the first pocket while using an exposed portion of the scrubber block.

7. The apparatus of claim 6, wherein the washing sheet is a high pile fabric having exposed fibers for sudsing and washing.

8. The apparatus of claim 7, wherein the fibers are Herculite fibers.

9. Cleaning apparatus, comprising a generally rectangular sheet having spaced longitudinal first and second parallel edges and spaced first and second end edges at ends of the longitudinal edges, stitches joining the sheet together along the edges, a first open pocket formed between the sheet within the sewn edges of the sheet, an opening formed along the edges of the sheet for providing access to the first pocket, a resilient rectangular block for fluid expulsion when being squeezed and fluid absorption when being released, a stiff mesh material overlying and surrounding the block and having edges stitched together, forming a second closed pocket for receiving and holding the block and forming with the block a scrubber block, a pull handle connected to the scrubber block, the scrubber block being placed in the first pocket formed by the sheet, with the handle being exposed through the second open end so that the scrubber block may be partially or fully withdrawn from the first pocket while using the sheet when encountering a spot requiring action of the scrubber block, the scrubber block being received within the first pocket in a friction fit for holding the scrubber block in the first pocket during use of the sheet, and for partially holding the scrubber block in the first pocket when using an exposed portion of the scrubber block.

10. The apparatus of claim 9, wherein the sheet is a washing sheet.

11. The apparatus of claim 10, wherein the washing sheet is a high pile fabric having exposed fibers for sudsing and washing.

12. The apparatus of claim 10, wherein the fibers are Herculite fibers.

13. The apparatus of claim 9, wherein the sheet is a drying sheet.

14. The apparatus of claim 13, wherein the drying sheet is a leather chamois.

15. The apparatus of claim 14, wherein the chamois is perforated for water absorption and dirt expulsion.

16. The apparatus of claim 9, wherein the sheet comprises two parts, a washing sheet part and a drying sheet part, and wherein the two parts are sewn together along three edges of each sheet with fourth edges left open to form the opening of the first pocket.

17. The apparatus of claim 16, wherein the washing sheet is a high pile fabric having exposed fibers for sudsing and washing.

18. The apparatus of claim 17, wherein the fibers are Herculite fibers.

19. The apparatus of claim 16, wherein the drying sheet is a leather chamois.

20. The apparatus of claim 19, wherein the chamois is perforated for water absorption and dirt expulsion.

* * * * *